March 25, 1952  H. VAN DER KOLK  2,590,480
CYCLONE SEPARATOR
Filed March 4, 1949
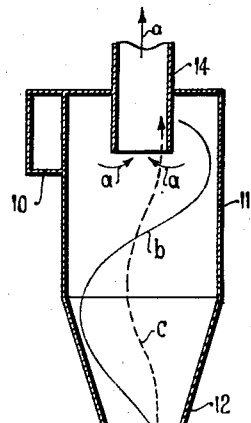
FIG.1
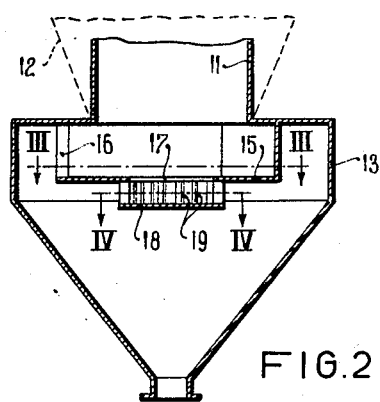
FIG.2
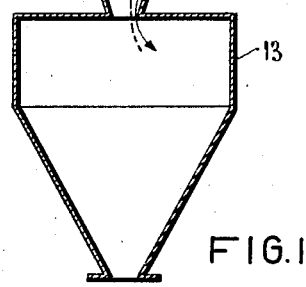
FIG.3
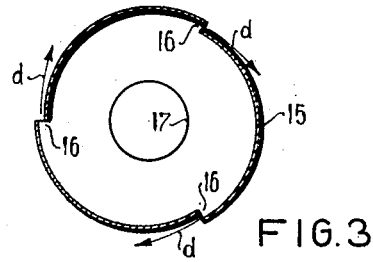
FIG.4
FIG.7
FIG.5
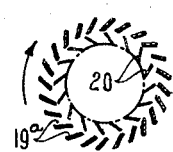
FIG.8
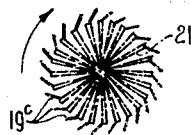
FIG.6
INVENTOR
HENDRIK VAN DER KOLK Patented Mar. 25, 1952

2,590,480

UNITED STATES PATENT OFFICE 2,590,480

CYCLONE SEPARATOR

Hendrik van der Kolk, Heemstede, Netherlands, assignor to Bureau van Tongeren N. V., Heemstede, Netherlands, a company of the Netherlands Application March 4, 1949, Serial No. 79,689
In the Netherlands March 16, 1948

6 Claims. (Cl. 183—83)

This invention relates to apparatus for removing dust from gases, and has particular reference to improvements in apparatus for this purpose of the well known "cyclone" type comprising, generally speaking, an open-bottom hollow body of circular shape in cross section disposed vertically and into the upper portion of which the dust-laden gases are introduced tangentially; a dust-collection bunker below and connected at its top with the open bottom of said hollow body; and a gas discharge pipe extending into the top of said hollow body. In such apparatus the gases introduced tangentially into the hollow body follow a helical, downward course through said hollow body, enter the bunker and then flow upwardly in an eddy stream, centrally through the substantially hollow, downwardly flowing stream, to the discharge pipe through which they escape from the apparatus. Due to centrifugal action, dust contained in the gases is thrown against the side walls of the hollow body and gravitates into the bunker, from which it may be removed through a valve-controlled bottom opening in the latter. Heretofore, however, some of the dust entering the bunker has usually became entrained in the upwardly flowing eddy stream, with the result that the gases discharged from the apparatus have not been as free of dust as they might be. Accordingly, the object of the present invention is to provide, in apparatus of the type referred to, simple, practical means whereby the upwardly flowing or eddy stream of gases is compelled to release a considerable amount of the dust carried thereby before said stream reaches the discharge pipe of the apparatus, thus to insure more thorough removal of dust from the gases than has heretofore been effected in apparatus of the type referred to.

The invention is illustrated in the accompanying drawings, wherein:

Figure 1 is a vertical section through a dust removing apparatus of the "cyclone" type illustrating the path of travel of the gases therethrough.

Figure 2 is a fragmental vertical section similar to Figure 1 illustrating one practical means in accordance with the present invention to compel the upwardly flowing or eddy stream of the gases to release a considerable amount of the dust carried thereby.

Figure 3 is a horizontal section on the line III—III of Figure 2.

Figure 4 is a horizontal section on the line IV—IV of Figure 2, and

Figures 5, 6, 7 and 8 are sectional views similar to Figure 4 illustrating alternative forms of the invention.

Fig. 1 of the drawings illustrates a vertical section of a conventional cyclone provided with a dust bunker. The dust loaded gas, supplied by conduit 10, enters tangentially into and at the top of the cylindrical body 11, and the lower end of said body merges into a cone 12 opening into a bunker 13. A vertical pipe 14, passed through a central opening in the top wall of body 11, projects a suitable distance downwardly into said body. In body 11, the dust is for the greater part thrown outwards and is discharged in downward direction, by a comparatively weak carrier current of gas, mainly along the inner walls of said body and of cone 12, into bunker 13. The gas, freed from a certain amount of dust, is discharged, in the direction of arrows $a$, $a$ by pipe 14, which communicates, for instance, with a chimney. Arrow $b$ indicates the path of the gas, which carries the dust towards bunker 13. Said gas necessarily returns from the bunker, whose bottom opening is closed by a valve, in the form of an eddy indicated by arrow $c$, which moves upwards, around the axis of body 11 and cone 12, centrally within current $b$.

It will be readily appreciated that eddy $c$ returns part of the dust, which had already reached bunker 13, towards pipe 14, especially if the bunker contains a considerable amount of dust, and this impairs the efficiency of the cyclone.

It has already been proposed to delete cone 12 so that the cylindrical body 11 directly opens into the dust bunker, and to provide, vertically below the opening between body and bunker, a chamber, whose bottom has a central aperture and whose side wall is provided with a plurality of vertical, tangential slots. The eddying, dust loaded current $b$ is then discharged by said slots without reversing its direction of rotation, so as to be compelled to continue its downward movement mainly along the wall of the bunker. The upward current of gas from the bunker returns into the body of the cyclone through the aforesaid central aperture, and it cannot be avoided that this return current is also loaded with an appreciable amount of dust. Obviously, such a chamber could as well be provided in a cyclone having a cone interposed between the body and the bunker.

As aforesaid, the present invention has for its object to provide a cyclone of the said type, in which the return current of gas is compelled to release a considerable proportion of the dust carried thereby before reaching the discharge pipe 14. With this object in view, the invention consists in providing a substantially horizontal partition vertically below the central aperture in the bottom of said chamber and in associating with said partition a circular series of spaced blades between which the return current of the gases flows and which are effective to reverse the direction of rotation of the return current. The result is that said blades baffle a considerable proportion of the dust suspended in the return current and cause it to drop into the bunker, instead of being discharged by pipe 14.

Beyond the reversing blades, the return current, which moves upward in the central zone of the cyclone, will rotate in a direction opposite that of the downcoming carrier current and of the main current eddying in the upper part of the cyclone. This impairs the efficiency of the cyclone. With a view to avoiding this interference, I preferably additionally provide beyond, but close to, the reversing blades a second circular series of blades disposed so as to again reverse the direction of rotation of the return current.

Fig. 2 shows, in a vertical section, the lower part of a cyclone in accordance with the invention. The dust bunker 13 here directly communicates with the lower end of the body 11 which may be either cylindrical as shown by full lines or conical as indicated by dotted lines.

The numeral 15 indicates the chamber secured to the bottom side of the top wall of the bunker, vertically below the aperture between the latter and the body 11. The tangential slots in the side wall of said chamber are indicated by 16 in Fig. 3, which is a section along the line III—III in Fig. 2. Some distance below the central bottom opening 17 of chamber 15 is a horizontal partition 18 which is connected with the bottom of said chamber through a circular series of reversing blades 19, see Fig. 4, which illustrates a section along the line IV—IV in Fig. 2. Rotation of the carrier and the return currents of the gases is in the same direction, as indicated by the arrows d and e in Figures 3 and 4, respectively, until the return current reaches the blades 19. However, said blades 19 are inclined in directions such that they require the return current, in order to pass between them, to have its direction of rotation reversed, whereby a considerable amount of the dust carried by the return current is caused to drop therefrom into the bunker.

The return current may be permitted to flow upwardly through the carrier current while rotating in a direction opposite to the direction of rotation of the carrier current, but this is undesirable as it would impair the efficiency of the apparatus. Accordingly, there preferably is provided, as illustrated in Figure 5, inwardly with respect to a first or outer series reversing blades 19a corresponding to the blades 19 of Figure 4, a second or inner series of reversing blades 20, whereby the return current, after having its direction of rotation reversed by the blades 19a, again has its direction of rotation reversed so that in flowing upwardly through the carrier current it rotates in the same direction as the carrier current.

Figure 6 of the drawings illustrates that the inner set of reversing blades, designated as 20b, may be of substantially semi-circular shape in cross section and may extend across the space below the opening in the bottom wall of the chamber 15 instead of in surrounding relationship to said space as in the case of the blades 20 illustrated in Figure 5. Otherwise the Figure 6 form of the invention is generally the same in construction and mode of operation as the Figure 5 form of the invention.

Figure 7 illustrates that instead of the blades of the two reversing sets being separate from each other, as in the Figures 5 and 6 forms of the invention, one blade of each set may be formed integrally with one blade of the other set. Otherwise, the Figure 7 form of the invention is generally the same, structurally and in mode of operation, as the Figures 5 and 6 forms of the invention. In Figure 7 the blades of the outer set are designated as 19c and the blades of the inner set are designated as 20c.

Figure 8 illustrates that the inner set of reversing blades, designated as 21, may be of the radial, inclined or fan-blade type. Otherwise, this form of the invention also is generally the same, structurally and in mode of operation, as the Figures 5 to 7 forms of the invention.

The bunker 13 shown in Fig. 2 may discharge into a second, larger bunker, in which case a valve should be interposed. If the second bunker is to be emptied, the said valve should be closed, otherwise a considerable amount of dust could be drawn upward from said bunker into the cyclone, if a vacuum obtains therein. In this case, bunker 13 serves the purpose of temporarily receiving the dust collected by the cyclone.

What I claim is:

1. Apparatus for removing dust from gases, comprising, a closed-top, open-bottom upright casing of substantially circular cross section, means for the delivery of dust-laden gases tangentially into the top portion of said casing whereby the gases are caused to rotate in their travel downwardly through and from said casing, a dust-collection bunker below and in communication at its top with said casing through the open bottom of the latter, a gas discharge pipe extending through the top of said casing downwardly a limited distance into said casing, a first wall in said bunker below the open bottom of said casing, second wall means substantially parallel to the axis of the casing connecting said first wall and the top of said bunker having at least one tangential slot for escape of the rotating gases into said bunker without having their direction of rotation changed, said first wall having therein an opening for return flow of the gases therethrough from said bunker upwardly to and through said casing substantially centrally of the latter to said discharge pipe, a third wall below and substantially parallel to said first mentioned wall, an annular set of spaced blades between said parallel walls in surrounding relationship to the space between said walls which is alined with the opening in said first mentioned wall, said blades being inclined to reverse the direction of rotation of the gases flowing from said bunker between said parallel walls to the opening in said first mentioned wall, and a second set of spaced blades between said parallel walls inwardly with respect to the blades of said first mentioned set effective to again reverse the direction of rotation of the gases and to return them to their original direction of rotation before they pass upwardly through the opening in said first mentioned horizontal wall.

2. Apparatus as set forth in claim 1 in which the individual blades of the two sets are formed integrally with each other.

3. Apparatus as set forth in claim 1 in which the blades of both sets extend substantially vertically between the said parallel walls.

4. Apparatus as set forth in claim 1 in which the blades of the second mentioned set are of the radially disposed fan-like type.

5. Apparatus for removing dust from gases, comprising, a casing of circular cross section closed at one end and open at the opposite end, means for delivery of dust-laden gas tangentially into the closed end portion of said casing whereby the gas is caused to rotate in its travel to the open end through and from said casing, a dust collecting bunker with which the open end of the casing is in communication, said bunker having a first exterior wall surrounding the open end of the casing, a gas discharge pipe extending through the closed end of said casing a limited distance into said casing, an interior wall in said bunker at substantially right angles to the axis of said casing and disposed some axial distance from the open end of said casing below said first exterior wall, second interior wall means arranged in substantially parallel relation with the axis of said casing and disposed between the interior side of said first exterior wall of the bunker that surrounds the open end of the casing, said wall means having at least one tangential slot for escape of the rotating gas into said bunker without having their direction of rotation changed, said first interior wall having an opening aligned with said casing for return flow of gases therethrough from the bunker into and through the casing centrally of the latter to said discharge pipe, a partition in said bunker substantially parallel with the said first interior wall and disposed a greater axial distance from the open end of said casing than said first interior wall, and a set of spaced blades between the said first interior wall and the said partition inclined to reverse the direction of rotation of the gas flowing from said bunker between said first interior wall and said partition to the opening in said first interior wall.

6. Apparatus as set forth in claim 5 including a second set of blades to again reverse the direction of rotation of the gases and to return them to their original direction of rotation after their original direction of rotation has been reversed by the first mentioned set of blades.

HENDRIK van der KOLK.

REFERENCES CITED

The following references are of record in the file of this patent:

UNITED STATES PATENTS

| Number | Name | Date |
| --- | --- | --- |
| 1,066,704 | Brassert | July 8, 1913 |
| 1,917,606 | Sillers | July 11, 1933 |
| 2,004,467 | Hawley | Jan. 11, 1935 |
| 2,106,589 | Bigger et al. | Jan. 25, 1938 |
| 2,204,509 | McKeever | Jan. 11, 1940 |
| 2,214,658 | Browning | Sept. 10, 1940 |
| 2,489,903 | Kraft et al. | Nov. 29, 1949 |